United States Patent
De Ridder et al.

(10) Patent No.: US 6,499,768 B2
(45) Date of Patent: Dec. 31, 2002

(54) JOINT ASSEMBLY FOR CONNECTING TWO TUBES

(75) Inventors: Christianus Gerardus Maria De Ridder, Hoogland (NL); Pieter Johannes Quintus Van Voorst Vader, Son (NL)

(73) Assignee: ASM International N.V., AC Bilthoven (NL)

( * ) Notice: Subject to any disclaimer, the term of this patent is extended or adjusted under 35 U.S.C. 154(b) by 0 days.

(21) Appl. No.: 09/870,935

(22) Filed: May 30, 2001

(65) Prior Publication Data

US 2002/0180208 A1 Dec. 5, 2002

(51) Int. Cl.7 .................................................. F16L 17/00
(52) U.S. Cl. ............................ 285/96; 285/98; 285/106; 285/911
(58) Field of Search ................................ 285/911, 261, 285/121.2, 13, 14, 96, 98, 106

(56) References Cited

U.S. PATENT DOCUMENTS

| | | | |
|---|---|---|---|
| 3,957,291 A | * 5/1976 | Edling et al. ................ 285/261 |
| 5,630,470 A | * 5/1997 | Lockwood, Jr. ............. 165/178 |
| 5,653,479 A | 8/1997 | Henderson | |
| 5,662,470 A | * 9/1997 | Huussen et al. ............. 219/390 |
| 5,979,543 A | * 11/1999 | Graham ....................... 285/261 |
| 6,206,603 B1 | * 3/2001 | Graham ....................... 285/261 |
| 6,328,347 B1 | * 12/2001 | Reder et al. ................. 285/261 |

* cited by examiner

Primary Examiner—Lynne H. Browne
Assistant Examiner—Aaron Dunwoody
(74) Attorney, Agent, or Firm—Knobbe, Martens, Olson & Bear, LLP

(57) ABSTRACT

A joint assembly for connecting two ceramic material tubes has a cup-ball interface. One of the tubes has at a first end a cup shaped member, and the other tube has at a first end a ball shaped member adapted to be received in the cup shaped member. The ball shaped member and the cup shaped member define the cup-ball interface. The cup shaped member is provided with a gas feed channel discharging at a first end into an annular groove at the cup-ball interface. At the other end, the cup shaped member is connected to a conduit outside the cup shaped member. The conduit is connected to an inert gas source having a pressure above atmospheric pressure.

11 Claims, 1 Drawing Sheet

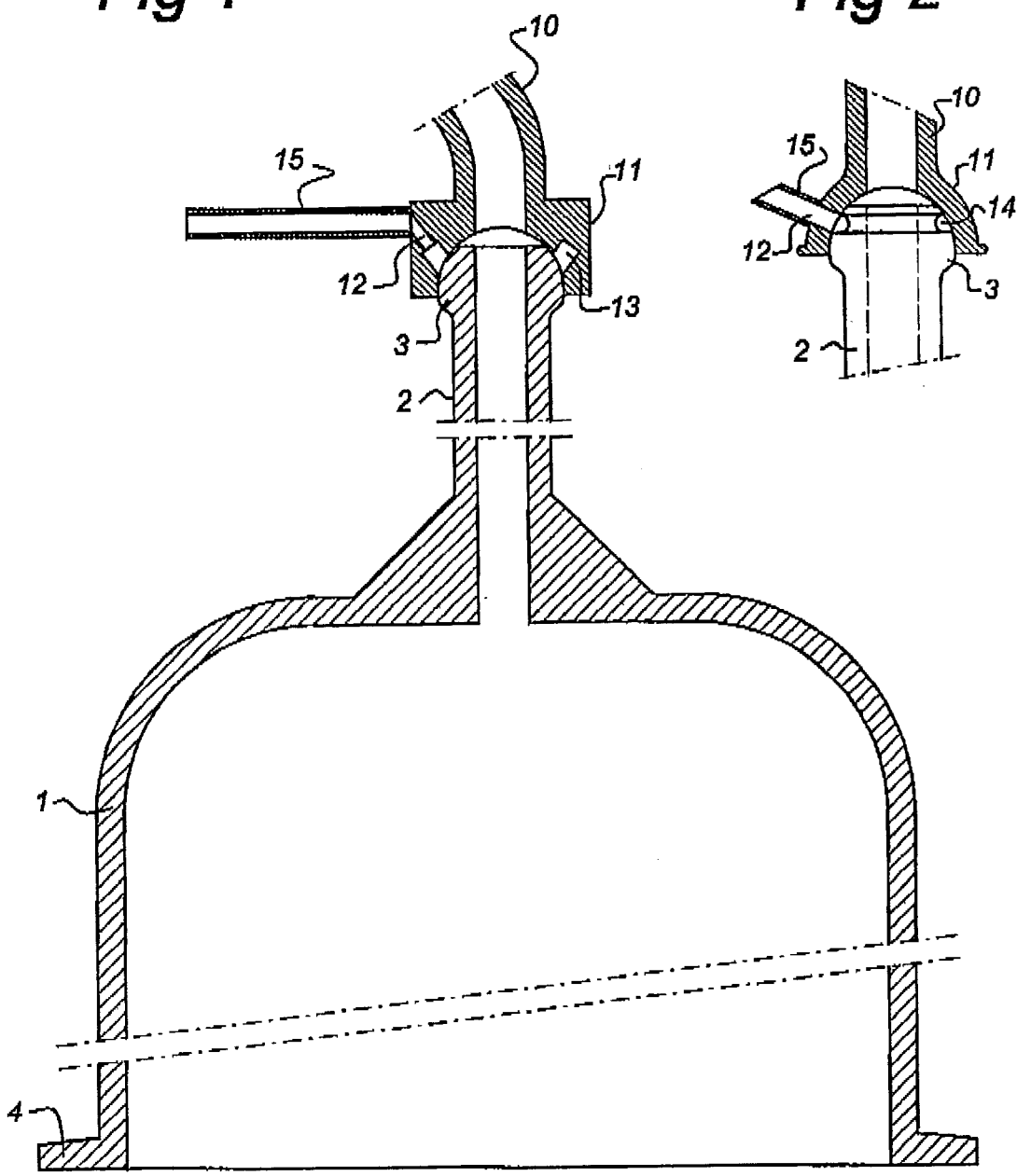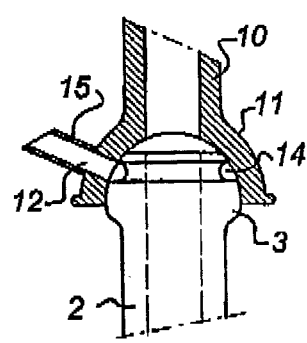

JOINT ASSEMBLY FOR CONNECTING TWO TUBES

TECHNICAL FIELD

The present invention relates to connecting two tubes through a ball-cup connection. This connection should be tight with regard to diffusion of gasses from the surrounding atmosphere.

BACKGROUND ART

In processes at elevated temperatures in furnaces, process tubes are used from ceramic material. Such tubes are connected to feed/discharge tubes outside the furnace or other tubes such as tubes in which a thermocouple or other sensor is introduced. Connection between the two tubes should prevent the ingress of gasses from the surrounding atmosphere into the process tube and leakage of process gasses to the surroundings.

In the prior art ball-cup connections are used to achieve this purpose. When the cup and the ball are dimensioned correctly and are perfectly mating, a high quality seal is achieved. However, in practice it is difficult to control the dimensional tolerances of the cup and the ball. Further, when the ball is larger than the cup, breakage of the cup can easily occur. Therefore the nominal diameter of the ball should always be slightly smaller than the diameter of the cup. Consequently, the ball and cup connection is not a perfect seal. Furthermore, if the ball and the cup are made of different materials some tolerances need to be allowed to accommodate differences in thermal expansion when the furnace is heated from room temperature to process temperature. Because the requirements regarding the leak integrity of such a connection have become more and more stringent, in the art the ball-cup connection is provided with an additional O-ring seal. However, in situations where the temperature of the connection is fairly high, the lifetime of the O-ring is impractical short due to aging of the material of the O-ring, In U.S. Pat. No. 5,653,479 a ball-cup connection is proposed to connected low pressure chemical vapor deposition (LPCVD) tube to a vacuum system via a vacuum exhaust tube. The cup, attached to the vacuum exhaust tube, contains annular shaped grooves, cut into the inside surface of the cup. Each groove contain a connection to a second vacuum system. When the ball, attached to the LPCVD process tube, is inserted into the cup, the open side of the grooves is bounded by the surface of the ball. The grooves are evacuated by the second vacuum system and this differentially pumped vacuum seal is sufficient to contain a rough vacuum, down to 1 mTorr.

This design has several limitations and disadvantages. The design of the cup is rather complex. All embodiments show three grooves, machined into the cup, which cup is of stainless steel. Stainless steel is not allowed at die inlet side of an oxidation furnace to connect e.g. an outside torch system to the process tube because it would lead to metallic contamination. Cutting the grooves in a ceramic cup, like quartz, is much more complicated and costly than cutting the grooves in stainless steel. Furthermore, for reasons given above, the diameter of the ball will always be smaller than the diameter of the cup. The more so as in the embodiment shown in U.S. Pat. No. 5,653,479 the cup is of stainless steel and the ball of ceramic material. Even when at room temperature the cup and ball fit exactly together, when heated the cup will be larger than the ball because of the larger thermal expansion coefficient of stainless steel as compared to quartz. The actual contact between cup and ball will be a line rather than a plane. Over the line contact, gas transport through diffusion can easily take place. Another disadvantage of the proposed connection is that it is directed towards vacuum applications. When the process tube is at atmospheric pressure, just as the surrounding atmosphere, it is not convenient to apply a vacuum to the connection because then air from outside and process gas from the inside are sucked into the coupling and meet each other there, resulting in potentially undesired reactions. Finally, the design requires a second vacuum system with all its connections and supplies, adding to the complexity of the installation.

It is the object of the invention to avoid the above disadvantages and provide in a high temperature resistant ball-cup connection that prevents the ingress of gasses from the surrounding atmosphere into the process tube and that is in particular suited for atmospheric process tubes.

SUMMARY OF THE INVENTION

According to one aspect of the invention a joint assembly is provided for connecting two tubes, one of said tubes comprising at its extremity a cup shaped member and the other of said tubes comprising at its extremity a ball shaped member to be received in said cup shaped member, said cup shaped member being provided with a gas feed channel discharging at one end into an annular groove at the cup/ball interface and at the other end connected to a conduit outside said cup shaped member, said conduit being connected to an inert gas source having a pressure above atmospheric pressure.

Because of the use of overpressure of the inert gas introduced between the parts of the ball joint, inert gas will be flowing from the annular groove through the gap between the cup shaped member and the ball shaped member, in one direction towards the surrounding atmosphere and in the opposing direction towards the interior of the process tube. The supply of inert gas should be such that in the gap an inert gas flow speed is maintained at a sufficiently high level such that back diffusion of atmospheric gasses such as oxygen and water vapor through the ball joint is reduced to an acceptable minimum.

The joint assembly according to the invention can be used in any application wherein two tubes have to be connected to each other and where the connection should be heat resistant and prevent the ingress of gasses from the surrounding atmosphere. More particular this joint is used in a furnace for processing semiconductor wafers.

According to a preferred aspect of the invention the process tube is provided with a ball at its extremity whilst the tube connecting thereto is provided with a cup shaped member. The tube connecting to the furnace tube can be a gas feed/discharge tube. However, the invention can also comprise the connection with a sensor tube. Typically, the process tube comprises a ceramic material like quartz or SiC. Preferably, the connecting tube comprises also a ceramic material like quartz or SiC, although for some applications it is possible that the connecting tube comprises a metal like stainless steel.

According to a further aspect, the invention relates to a method for operating of a furnace, comprising a ceramic material furnace tube in which a substrate is processed and through which a processing gas is flowed, a ceramic material feed/discharge tube connected to said furnace tube through a ball joint and through which said processing gas and possible reactants are fed/discharged, wherein between the cup and the ball of said ball joint an inert gas having a super atmospheric pressure is introduced.

BRIEF DESCRIPTION OF THE FIGURES

FIG. 1 is an illustration of a first embodiment of a ball-cup connection, comprising a groove in the cup.

FIG. 2 is an illustration of a second embodiment of a ball-cup connection, comprising a groove in the ball.

DETAILED DESCRIPTION OF THE INVENTION

A process tube, connecting to a connecting tube by a ball-cup connection is shown in FIG. 1. The process tube 1 comprises a gas feed/discharge tube 2 which is provided at its extremity with the ball member 3. The connecting tube 10 is provided at its extremity with the cup member 11. Of connecting tube 10, only the part close to the extremity provided with the cup member 11 is shown. The walls of connecting tube 10 delimit a process gas feed/discharge channel. The cup is provided with an inert gas feed channel 12, discharging at one en into an annular groove 13, cutted-out into the cup and at the other end provided with a connection 15 to be connected to a conduit, said conduit being connected to an inert gas source having a pressure above atmospheric pressure. Both said conduit and said inert gas source are not shown in FIG. 1. Although it is not essential, it is standard practice to provide the process tube with the ball member because the cup member is more fragile than the ball member is. Repair or replacement of the connecting tube in case of a broken cup is easier and less costly than repair or replacement of the process tube. The lower end of process tube 1 is provided with a tube flange 4 and rests on a support structure, not shown. The support structure can be provided with a further tube, such that process gas is supplied into process tube 1 via connecting tube 10, and process gas is exhausted via the further tube. Supply and exhaust can also be reversed. As an alternative, the process tube itself can be provided with a further tube to provide for supply and exhaust functions of the process gas.

In FIG. 2, the ball member 10 is provided with an annular groove 14 in which the gas feed channel 12 discharges. The other end of channel 12 is provided with connection 15, to be connected to a conduit, said conduit being connected to an inert gas source having a pressure above atmospheric pressure. This is a convenient embodiment because balls, provided with a groove, are commercially available. The intention of the groove in these commercially available parts is to accommodate an O-ring to provide a non-heat resistant seal according to the prior art. Nevertheless, they can be used as building blocks to provide a coupling according to the invention.

Although not shown in FIGS. 1 and 2, the joint needs to be provided with a clamp to keep the ball and the cup together. In particular because the inert gas in the groove 13 or 14 is at superatmospheric pressure, such a clamp is required to prevent ball and cup from moving away from each other. This clamp can be any clamp known in the art for this purpose. Both in the embodiment of FIGS. 1 and 2, the uppermost part of the ball is truncated to provide for a more convenient and reliable fit. Usual materials for process tubes and connecting tubes are quartz and Silicon Carbide but other ceramic materials are also possible.

In the method according to the invention for operating of a furnace as described above, it is essential that the supply of the inert gas, to be introduced between the cup and ball at superatmospheric pressure, it at such a rate as to maintain a gas velocity that is sufficient to counteract the in-diffusion of ambient air into the process tube. This will be illustrated by the example below.

EXAMPLE

A ball joint is used having a Silicon Carbide ball diameter of 28.222 mm. The diameter of the quartz cup is 28.582 mm. Further taking into account the tolerances in these dimensions the difference in diameter between ball and cup can be 0.36 mm maximum, resulting in an annular gap between ball and cup of 0.18 mm maximum. The cross section of the gap is then the width×length=$0.18 \times \pi \times 28 = 16$ mm2. Assuming a temperature of the joint of 400° C., the diffusivity of O2 in N2 is $9.2 \times 10^{-5}$. Choosing a path length of the gas of 10 mm, which is the distance that the inert gas has to travel from the groove 13, 14 through the gap to the atmospheric ambient, and a gas velocity of 100 mm/s, the concentration of O2 in N2 can be kept below 4 ppm. To maintain this gas velocity of 100 mm/s over the gap cross section of 16 mm2, a gas flow @ 400° C. is required of 100×16 mm3/s which equals about 100 cm3/min. Converting this to a gas flow at standard conditions results in 40 sccm (standard cubic centimeter per minute). Depending on the dimensioning and the size of the cup and ball, a different gas flow is require. However, a gas velocity of 20 mm/s seems a practical lower limit that should be maintained.

What is claimed is:

1. A joint assembly for connecting two ceramic material tubes, wherein one of the tubes comprises at a first end a cup shaped member and the other tube comprises at a first end a ball shaped member adapted to be received in the cup shaped member, so as to define a cup-ball interface, the cup shaped member being provided with a gas feed channel discharging at a first end into an annular groove at the cup-ball interface and at the other end connected to a conduit outside the cup shaped member, the conduit being connected to an inert gas source having a pressure above atmospheric pressure.

2. The joint assembly according to claim 1, wherein one of the tubes comprises a process tube in a furnace and is provided with a ball shaped member.

3. The joint assembly according to claim 1, wherein one of the tubes comprises a gas tube for feeding and discharging gas and is provided with a cup shaped member.

4. The joint assembly according to claim 1, wherein the annular groove is provided in the cup shaped member.

5. The joint assembly according to claim 1, wherein the annular groove is provided in the ball shaped member.

6. The joint assembly according to claim 1 wherein the inert gas source comprises a nitrogen source.

7. The joint assembly according to claim 1, wherein at least one of the ceramic tubes comprises Silicon Carbide material.

8. The joint assembly according to claim 1, wherein at least one of the ceramic tubes comprises quartz material.

9. A method for operating a furnace, comprising:

providing a ceramic material furnace tube in which a substrate is processed and through which a processing gas is flowed;

connecting a ceramic material discharge tube to the furnace tube through a ball joint discharging processing gas and reactants through the ball joint comprising a ball and a cup and defining a gap therebetween; and introducing an inert gas having a super atmospheric pressure between the cup and the ball of the ball joint.

10. The method according to claim 9, wherein the ball diameter is smaller than the cup diameter and the inert gas flow introduced between the cup and the ball is sufficiently large to maintain a gas velocity in the gap between the ball and the cup of 20 mm/s or more.

11. The method according to claim 9, wherein the inert gas comprises nitrogen.

* * * * *